US006957855B1

(12) United States Patent
Weary

(10) Patent No.: US 6,957,855 B1
(45) Date of Patent: Oct. 25, 2005

(54) SEAT FOR A BICYCLE

(76) Inventor: Philip R. Weary, 23544 Highland Glen Dr., Santa Clarita, CA (US) 91321

( * ) Notice: Subject to any disclaimer, the term of this patent is extended or adjusted under 35 U.S.C. 154(b) by 38 days.

(21) Appl. No.: 10/769,410

(22) Filed: Jan. 31, 2004

Related U.S. Application Data

(63) Continuation-in-part of application No. 10/430,775, filed on May 6, 2003, now abandoned.

(51) Int. Cl.[7] .............................. B60N 2/38; B62J 1/24; B62J 1/00; B62J 1/01
(52) U.S. Cl. .............................. 297/195.1; 297/195.11; 297/201; 297/204; 297/197
(58) Field of Search ......................... 297/195.1, 195.11, 297/201, 204; 280/288.1

(56) References Cited

U.S. PATENT DOCUMENTS 4,683,970 A * 8/1987 Smith ........................... 180/15
4,778,192 A * 10/1988 McElfresh .................. 280/226.1
5,383,675 A * 1/1995 Liebert ........................ 280/266
5,419,574 A * 5/1995 Krumm ....................... 280/278
5,607,171 A * 3/1997 Labranche ................. 280/228.1
5,782,639 A * 7/1998 Beal ............................ 434/29
6,585,278 B1 * 7/2003 Cerqua et al. .............. 280/287
6,705,674 B1 * 3/2004 McMahan et al. ....... 297/195.1

FOREIGN PATENT DOCUMENTS

DE       4238874 A1 *  5/1993   ............. B62J 1/00

* cited by examiner

Primary Examiner—Peter M. Cuomo
Assistant Examiner—Sarah C. Burnham
(74) Attorney, Agent, or Firm—Ted Masters

(57) ABSTRACT

A seat for a bicycle includes two suspended seat straps which support the buttocks of a rider. The straps are attached to front and rear support arms which are attached to two points on the frame of the bicycle. The front support arms form an inverted bifurcated assembly which is attached to the bicycle frame via a shock absorber. A ball and socket fitting permits the inverted bifurcated assembly to move in pitch, yaw, and roll, thereby conforming to the movements of the rider.

8 Claims, 5 Drawing Sheets

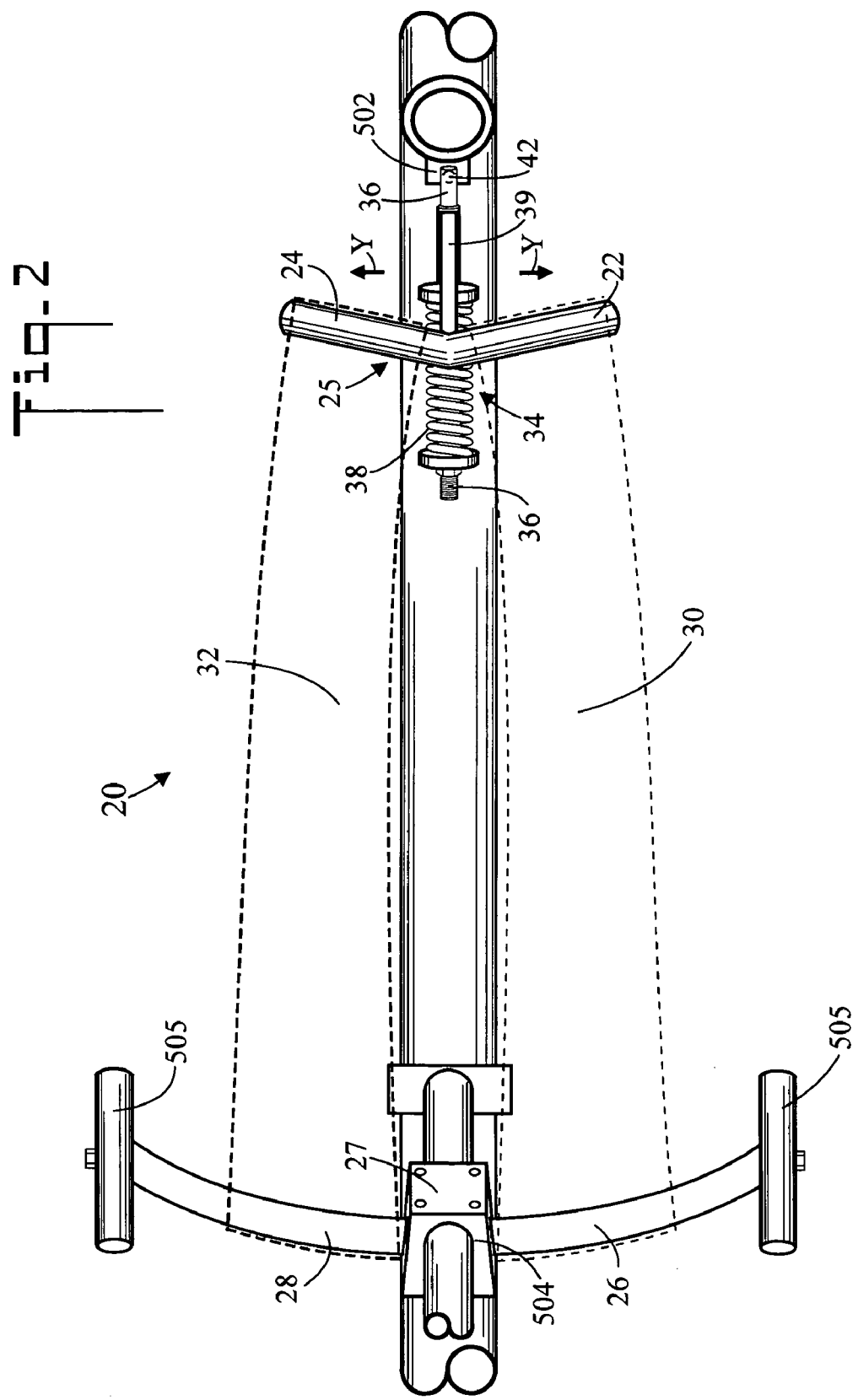

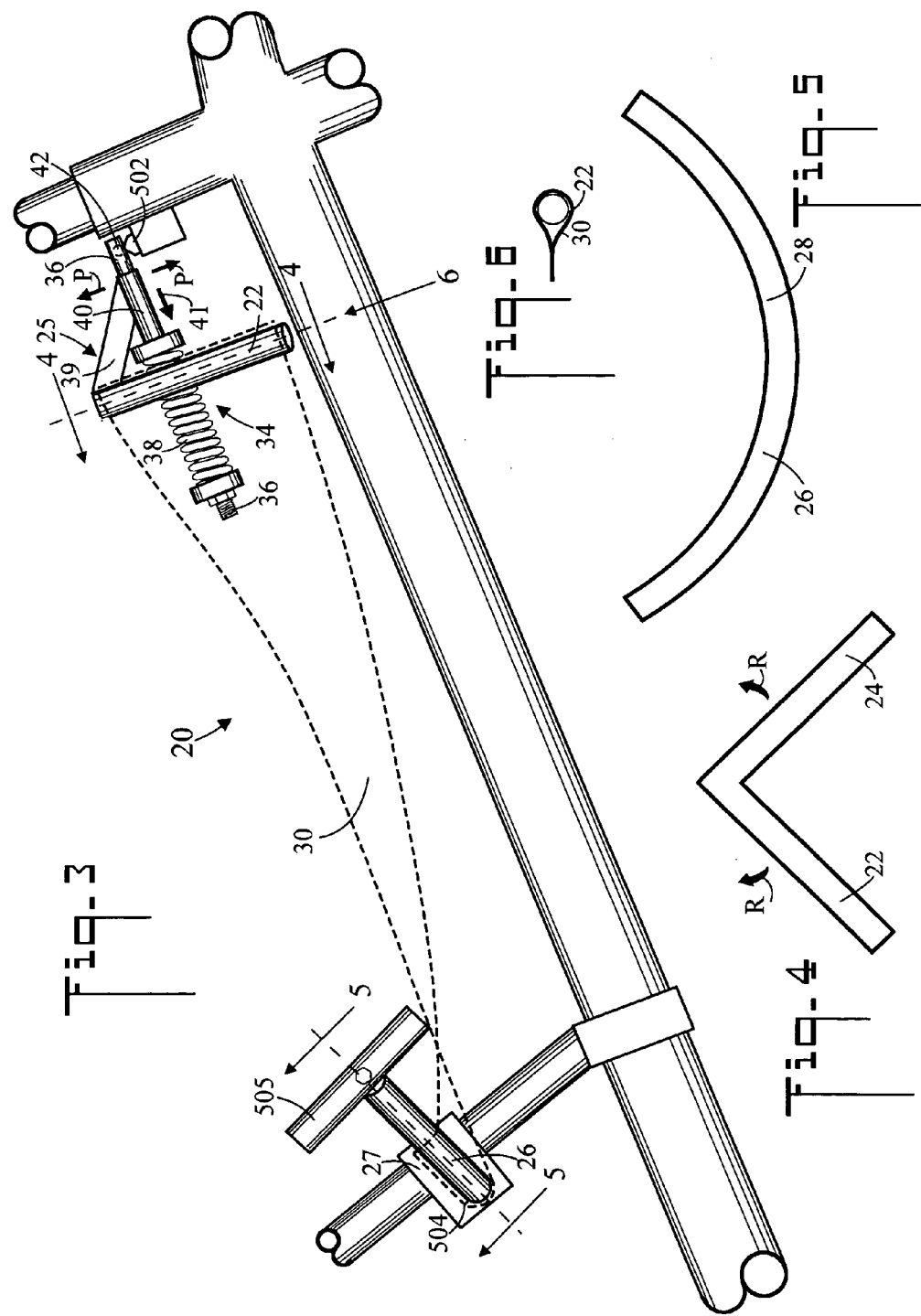

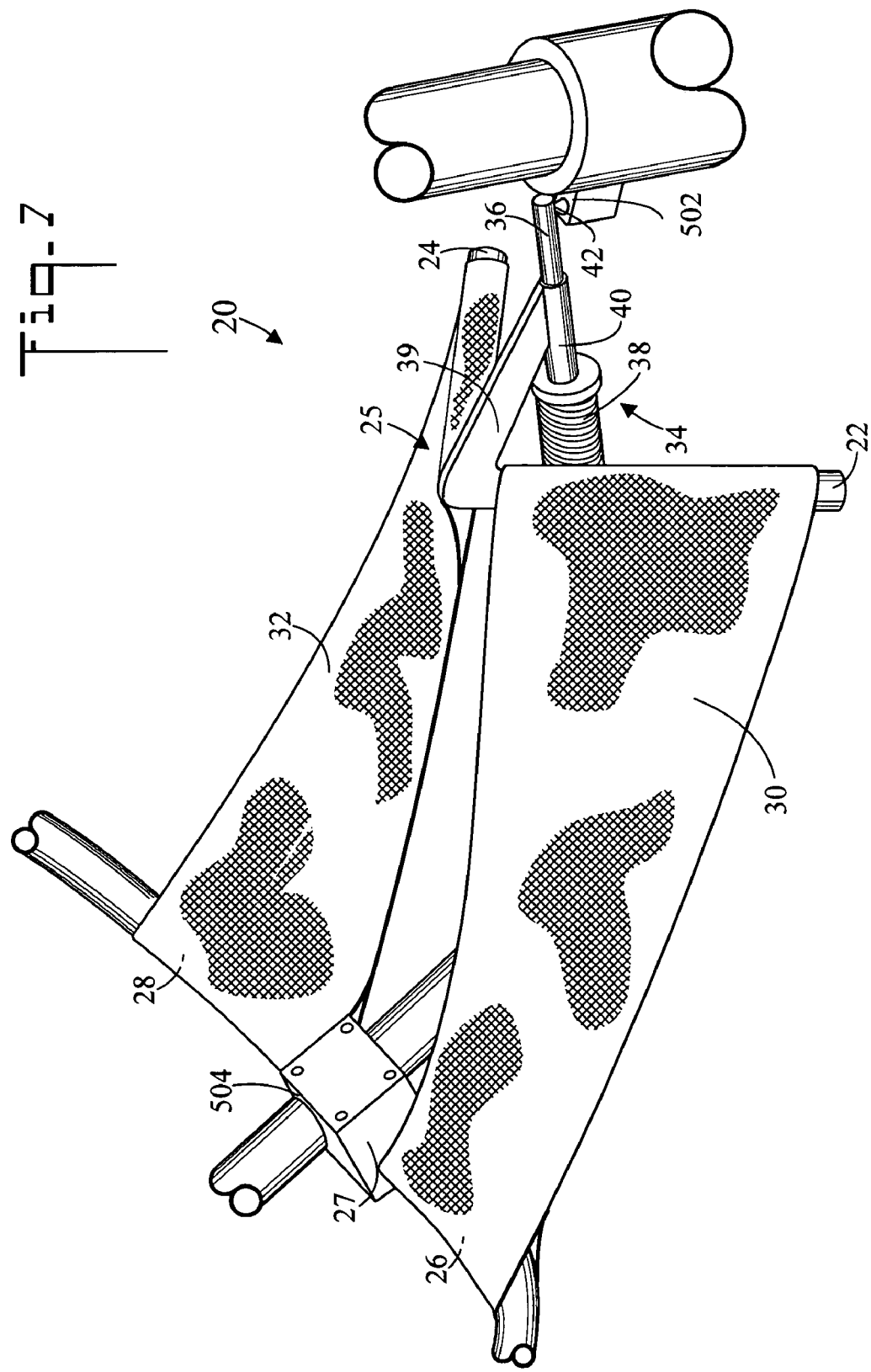

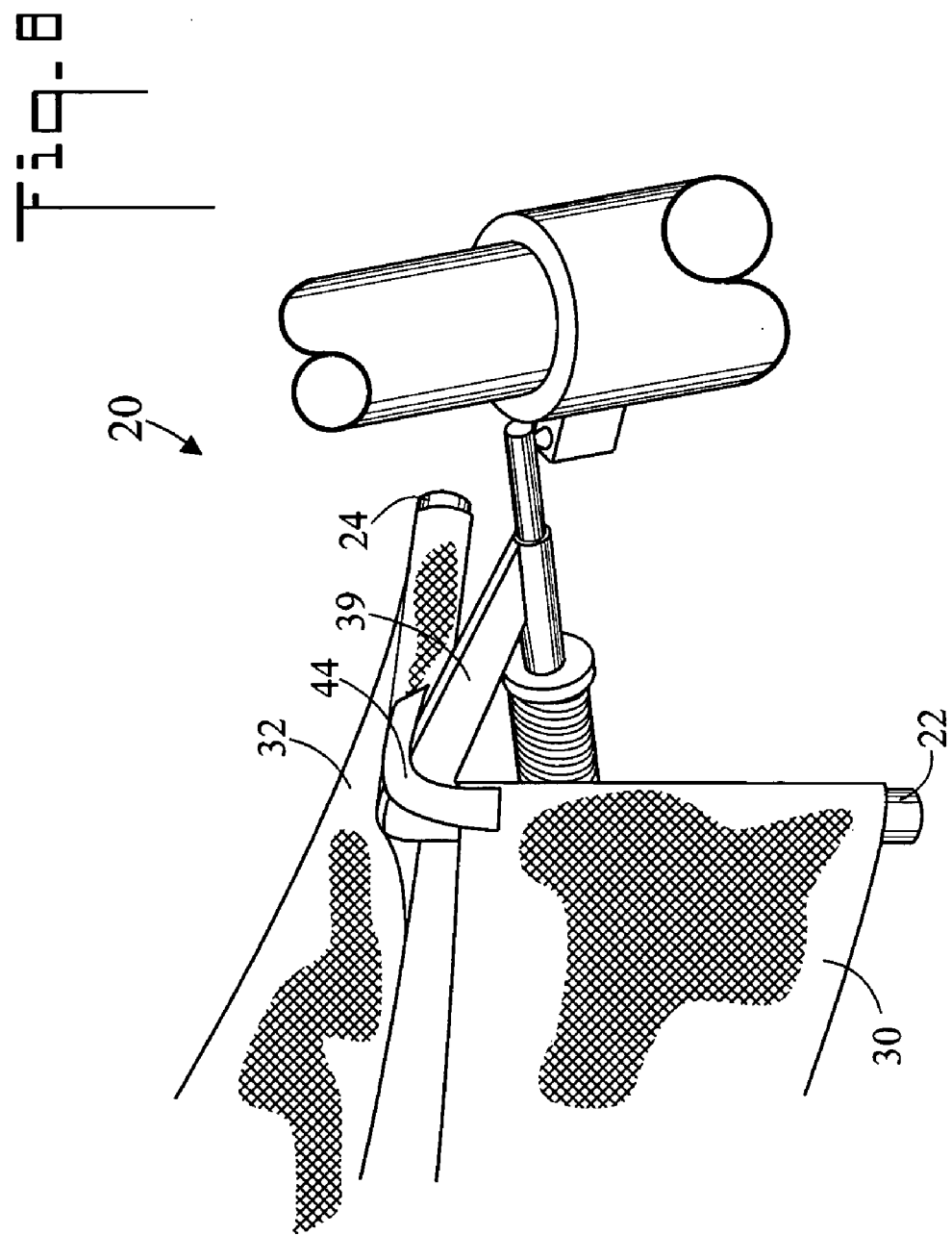

SEAT FOR A BICYCLE

CROSS REFERENCE TO RELATED APPLICATION

This application is a Continuation in Part of application Ser. No. 10/430,775, filed May 6, 2003 now abandoned, which is included herein by reference.

TECHNICAL FIELD

The present invention pertains generally to bicycles, and more particularly to a seat for a bicycle wherein the buttocks of a rider are supported by two suspended straps.

BACKGROUND OF THE INVENTION

A recumbent bicycle is a bicycle in which the rider is oriented in a reclined rather than upright position. As such, conventional bicycle seats are not well adapted for recumbent bicycles, and other means of rider support are required. The present invention comprises a seat for a recumbent bicycle which is specifically tailored to comfortably carry a reclined rider.

A seat for a recumbent bicycle is disclosed in German Patent DE 42 38 874 A1. In this device a reclining seat assembly has a seat back slung between upper and lower supports, and a seat which is slung between front and rear supports.

BRIEF SUMMARY OF THE INVENTION

The present invention is directed to a seat for a bicycle. The present invention is particularly useful on recumbent bicycles wherein a rider is in a reclined position which is not compatible with conventional bicycle seats. The seat includes a pair of a suspended fabric support straps which support the buttocks of the rider in hammock fashion. The suspended seat provides a more uniform distribution of a rider's weight which cannot be achieved on a recumbent bicycle by a conventional seat. Additionally a spring is fitted within the suspension system thereby providing cushioning for a rider when encountering rough roads. The fabric support straps are light weight and provide air circulation. While the present invention has been found useful on a recumbent bicycle, the seat disclosed herein could also be applied to other types of bicycles.

In accordance with a preferred embodiment of the invention, a seat for a bicycle having a frame having a forward attachment point and a rearward attachment point includes:
- a first front support arm connected to a second front support arm, the first and second front support arms forming a substantially downwardly opening bifurcated assembly, the bifurcated assembly connected to the forward attachment point of the bicycle frame;
- a first rear support arm connected to a second rear support arm, the first and second rear support arms connected to the rearward attachment point of the bicycle frame;
- a first support strap connected between the first front support arm and the first rear support arm; and,
- a second support strap connected between the second front support arm and the second rear support arm.

In accordance with an aspect of the invention, the first and second front support arms form an inverted vee structure.

In accordance with another aspect of the invention, a shock absorber assembly connects the bifurcated assembly to the forward attachment point of the bicycle frame.

In accordance with another aspect of the invention, a ball and socket fitting connects the shock absorber assembly to the forward attachment point of the bicycle frame.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 2 is a top elevation view of the seat;

FIG. 3 is a side elevation view of the seat;

FIG. 4 is a cross sectional view along the line 4—4 of FIG. 3;

FIG. 5 is a cross sectional view along the line 5—5 of FIG. 3;

FIG. 6 is a view in direction 6 of FIG. 3;

FIG. 7 is a front perspective view of the seat; and,

FIG. 8 is fragmented front perspective view of the seat.

DETAILED DESCRIPTION OF THE INVENTION

Figure 1:
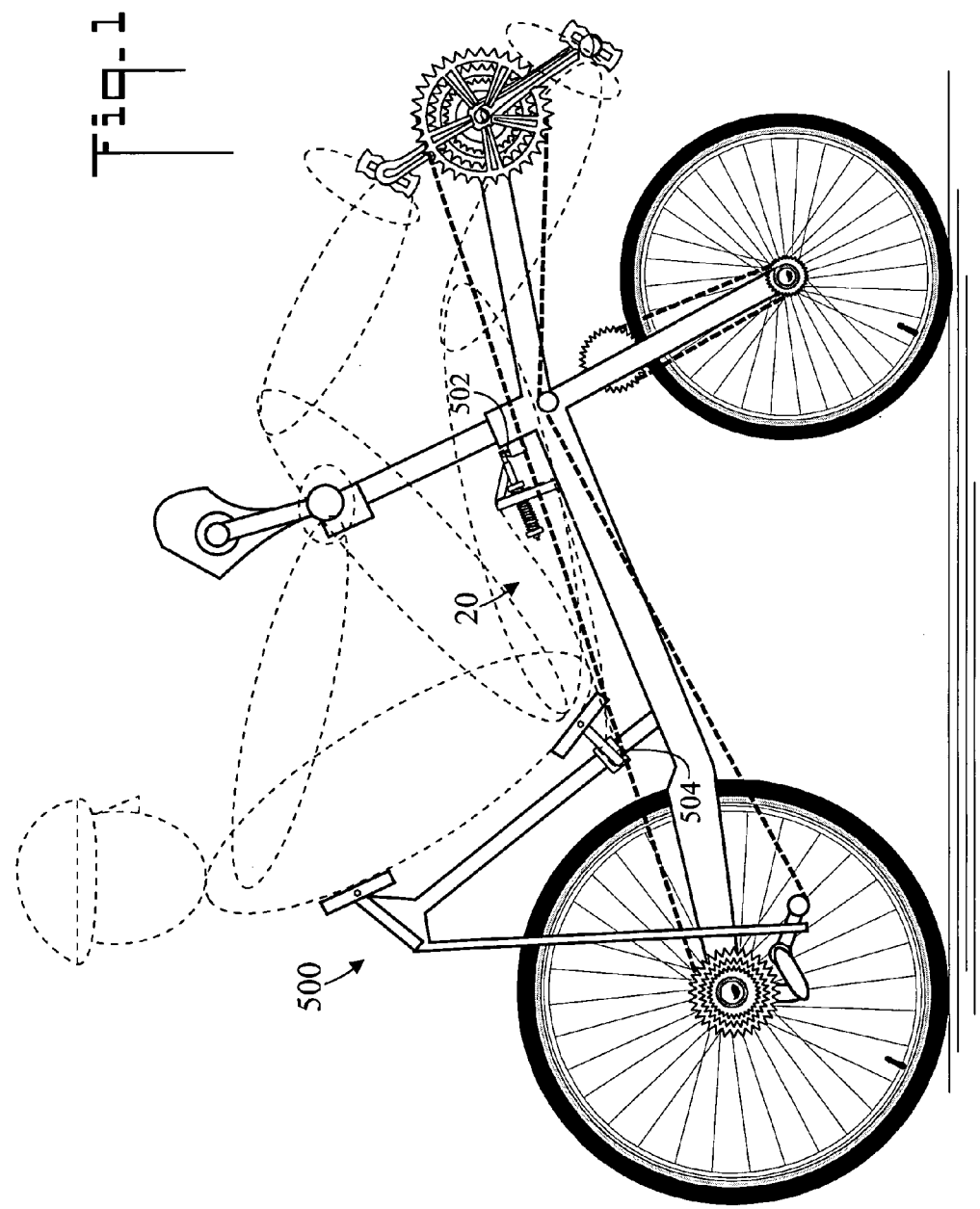
FIG. 1 is a reduced side elevation view of a recumbent bicycle having a seat in accordance with the present invention.

Referring initially to FIG. 1, there is illustrated a reduced side elevation view of a recumbent bicycle 500 having a seat 20 in accordance with the present invention. Seat 20 is attached to the frame of bicycle 500 between a forward attachment point 502 (a headset in the shown embodiment) and a rearward attachment point 504 (a back post in the shown embodiment). Seat 20 supports the buttocks of a rider in a manner similar to a hammock.

Now referring to FIGS. 2, 3, and 7 there are illustrated top plan, side elevation, and front perspective views respectively of seat 20. Seat 20 includes a first front support arm 22 connected to a second front support arm 24. First 22 and second 24 front support arms form a substantially downwardly opening bifurcated assembly 25, wherein bifurcated assembly 25 is connected to forward attachment point 502 of the bicycle frame. In the shown preferred embodiment, first 22 and second 24 front support arms forming an inverted vee (refer also to FIG. 4). The inverted vee shape of bifurcated assembly 25 serves to comfortably conform to the inner thighs of the rider.

A first rear support arm 26 is connected to a second rear support arm 28. First 26 and second 28 rear support arms are connected to rearward attachment point 504 of the bicycle frame by means of an attachment block 27. In the shown embodiment first 26 and second 28 rear support arms are curved to generally conform to the buttocks of a rider, and comprise the inward portions of a U shaped member (refer also to FIG. 5). The U shaped member is also used to attach opposite lower back supports 505 which have a support strap (not shown) slung therebetween which supports the lower back of the rider.

A first support strap 30 is connected between first front support arm 22 and first rear support arm 26, and a second support strap 32 is connected between second front support arm 24 and second rear support arm 28. First 30 and second 32 support straps are of sufficient width to support the buttocks of a rider much as would a hammock. In a preferred embodiment of the invention, first 30 and second 32 support straps are fabricated from plastic mesh fabric. First 30 and second 32 support straps have loops at both their ends which slip over and around the front and rear support arms (refer also to FIG. 6). In FIGS. 2 and 3 first 30 and second 32 support straps are shown in dotted lines to permit the underlying support structure to be shown.

In the shown preferred embodiment of the invention, a shock absorber assembly 34 connects bifurcated assembly 25 to forward attachment point 502 of the bicycle frame. Shock absorber assembly 34 includes a tension shaft 36 which is received by a spring 38. Tension shaft 36 passes through and is slidably received by a sleeve 40 on bifurcated assembly 25 and is then connected to forward attachment point 502 on the bicycle frame. Bifurcated assembly 25 also contains a bridge 39 which connects first 22 and second 24 front support arms to sleeve 40. When the bicycle goes over a bump, first 30 and second 32 support straps exert a rearward force on bifurcated assembly 25 which moves along tension shaft 36 in direction 41 causing spring 38 to compress and smooth out the ride. In the shown preferred embodiment, a ball and socket fitting 42 (also known as a ball and socket joint) connects shock absorber assembly 34 to forward attachment point 502 of the bicycle frame. Ball and socket fitting 42 allows bifurcated assembly 25 (including first 22 and second 24 front support arms) to move in pitch P (refer to FIG. 3), yaw Y (refer to FIG. 4), and roll R (refer to FIG. 4) with respect to forward attachment point 502. Because of this freedom of motion, bifurcated assembly 25 can conform to the motions of the rider.

FIG. 4 is a cross sectional view along the line 4—4 of FIG. 3. First 22 and second 24 front support arms combine to comprise a generally downwardly opening bifurcated assembly 25. In the shown embodiment first 22 and second 24 front support arms from an inverted vee shape.

FIG. 5 is a cross sectional view along the line 5—5 of FIG. 3 shown the U shaped member which includes first 26 and second 28 rear support arms.

FIG. 6 is a view in direction 6 of FIG. 3 showing how first support strap 30 loops around first front support arm 22.

FIG. 8 is fragmented front perspective view of seat 20. First support strap 30 has a first loop which accepts first front support arm 22 (also refer to FIG. 6), and second support strap 32 has a second loop which accepts second front support arm 24. A tether 44 selectively connects the first loop to the second loop. In an embodiment of the invention tether 44 is connected using a hook and loop fastener. Tether 44 is useful in preventing first 30 and second 32 support straps from migrating down first front support arm 22 and second front support arm 24 respectively as a result of rider weight and motion.

The preferred embodiments of the invention described herein are exemplary and numerous modifications, variations, and rearrangements can be readily envisioned to achieve an equivalent result, all of which are intended to be embraced within the scope of the appended claims.

I claim:

1. A seat for a bicycle having a frame having a forward attachment point and a rearward attachment point, said seat comprising:
    a first front support arm connected to a second front support arm, said first and second front support arms forming a downwardly opening bifurcated assembly, said bifurcated assembly connectable to the forward attachment point of the bicycle frame;
    a first rear support arm connected to a second rear support arm, said first and second rear support arms connectable to the rearward attachment point of the bicycle frame;
    a first support strap connected between said first front support arm and said first rear support arm; and,
    a second support strap connected between said second front support arm and said second rear support arm.

2. The seat according to claim 1, further including:
    said first and second front support arms forming an inverted vee.

3. The seat according to claim 1, further including:
    a shock absorber assembly connecting said bifurcated assembly to the forward attachment point of the bicycle frame.

4. The seat according to claim 3, further including:
    a ball and socket fitting connecting said shock absorber assembly to the forward attachment point of the bicycle frame.

5. The seat according to claim 1, further including:
    said first and second rear support arms each being curved, and comprising inward portions of a U-shaped member.

6. The seat according to claim 1, further including:
    said first support strap having a first loop which accepts said first front support arm, and said second support strap having a second loop which accepts said second front support arm; and,
    a tether selectively connecting said first loop to said second loop.

7. The seat according to claim 1, further including:
    said first and second front support arms forming an inverted vee;
    a shock absorber assembly connecting said bifurcated assembly to the forward attachment point of the bicycle frame;
    a ball and socket fitting connecting said shock absorber assembly to the forward attachment point of the bicycle frame; and,
    said first and second rear support arms each being curved.

8. A seat for a bicycle having a frame having a forward attachment point and a rearward attachment point, said seat comprising:
    a first front support arm connected to a second front support arm, said first and second front support arms forming a downwardly opening bifurcated assembly, said bifurcated assembly connectable to the forward attachment point of the bicycle frame;
    a first rear support arm connected to a second rear support arm, said first and second rear support arms connectable to the rearward attachment point of the bicycle frame;
    a first support strap connected between said first front support arm and said first rear support arm;
    a second support strap connected between said second front support arm and said second rear support arm;
    a shock absorber assembly connecting said bifurcated assembly to the forward attachment point of the bicycle frame; and,
    a ball and socket fitting connecting said shock absorber assembly to the forward attachment point of the bicycle frame.

* * * * *